US011929205B2

(12) United States Patent
Duong et al.

(10) Patent No.: US 11,929,205 B2
(45) Date of Patent: Mar. 12, 2024

(54) ULTRACAPACITOR POWER SYSTEM

(71) Applicant: VIETTEL GROUP, Ha Noi (VN)

(72) Inventors: Truong Giang Duong, Ha Noi (VN); Canh Duong Nguyen, Ha Noi (VN); Duc Anh Nguyen, Ha Noi (VN); Xuan Chien Vuong, Yen Thanh District (VN); Phuong Nam Tran, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 521 days.

(21) Appl. No.: 17/316,457

(22) Filed: May 10, 2021

(65) Prior Publication Data

US 2021/0366663 A1 Nov. 25, 2021

(30) Foreign Application Priority Data

May 25, 2020 (VN) .............................. 1-2020-02943

(51) Int. Cl.
| | |
|---|---|
| *H01G 11/08* | (2013.01) |
| *F02N 11/08* | (2006.01) |
| *H01G 9/14* | (2006.01) |
| *H01G 11/14* | (2013.01) |
| *H01G 11/84* | (2013.01) |
| *H02J 7/34* | (2006.01) |

(52) U.S. Cl.
CPC ............... *H01G 11/08* (2013.01); *H01G 9/14* (2013.01); *H01G 11/14* (2013.01); *H01G 11/84* (2013.01); *H02J 7/345* (2013.01); *F02N 2011/0885* (2013.01)

(58) Field of Classification Search
USPC ........................................................ 320/167
See application file for complete search history.

(56) References Cited

U.S. PATENT DOCUMENTS

2008/0290842 A1* 11/2008 Davis ..................... B60L 50/40
320/166
2018/0337550 A1* 11/2018 Agrelo ................... H01G 11/22
2021/0366663 A1* 11/2021 Duong .................. H02J 7/0031

* cited by examiner

*Primary Examiner* — Mohammed Alam
(74) *Attorney, Agent, or Firm* — patenttm.us

(57) ABSTRACT

The invention offers an ultracapacitor-based power system solution with four main functional blocks which are power conditioning block, monitoring block, charge-discharge block and protection block. The proposed system has the advantage of working well in the environment of vibration, high temperature, has a large capacity to provide a large amount and radiates less heat compared to systems using traditional batteries. In addition, the system has functions to protect and stabilize the output voltage, and the operating parameters of the system is monitored continuously.

1 Claim, 3 Drawing Sheets

ULTRACAPACITOR POWER SYSTEM

FIELD OF THE INVENTION

The present disclosure refers to the field of ultracapacitors. Specifically, it proposes a backup system based on ultracapacitors for storage and provide backup power for one-shot flying objects using in military.

BACKGROUND DESCRIPTION

Ultracapacitors, also known as double-layer capacitors, store electrostatic energy by polarizing the electrolytic solution. This energy storage mechanism is a highly reversible and stable process, which only moves charges and ions and does not make or break chemical bonds. Therefore, ultracapacitors are capable of undergoing hundreds of thousands of complete cycles with minimal change in performance. Long term storage is not an issue, since the ultracapacitor can be stored completely discharged.

Since ultracapacitors operate without relying on chemical reactions, they can operate over a wide range of temperatures, which is critical for military applications. On the high side, they can operate up to 65° C., and withstand storage up to 85° C., without risk of thermal runaway. On the low side, they can deliver power (with slightly increased resistive losses) as cold as –40° C., well below the cold performance threshold of batteries, an excellent fit for engine-starting applications.

Since the power system on board of many classes of flying objects is supplied by the main engine-driven generators, ultracapacitors are suitable to start-up, peak-power shaving and providing backup energy during a power outage.

Currently, the battery system applied in the aerospace field must meet some stability requirements when working in harsh environments such as vibration or high temperatures. The use of Li-Po batteries is simple, but combustible and unsuitable for use in vibration and high temperature environments. In addition, Li-Po batteries need regular maintenance to prevent battery cell death. Another solution commonly used in similar products around the world is the thermal cell. Thermal batteries have the advantage of long life, good performance in harsh environments, but can only be used once, fail to test well/fail before operation, not suitable if it is necessary to periodically check the system, regularly.

The use of batteries in the power supply system has some outstanding disadvantages such as flammability, sensitivity to vibration, high temperature, slow charging speed, and therefore battery usage in active systems. In harsh environments, there are many limitations and no guarantee of safety. Thanks to the advantages of high performance, good performance in vibrating environments and temperatures up to 80 degrees C., it is increasingly used in the military and aviation fields to replace. The source system uses traditional batteries. In the world, a number of ultracapacitors have been mentioned, specifically as follows:

Patent CN109196612A, China Nov. 1, 2019 proposes ultracapacitor technology that allows ultracapacitors to operate in environments of over 80 degrees Celsius.

Patent CN106298251B, China, Jan. 25, 2016, proposes to use ultracapacitor technology with Lithium electrode layer to allow storage of large energy density.

The two inventions above show technology to produce ultracapacitors capable of operating in high temperature environments as well as the ability to store large energy. However, these two inventions have not yet provided a specific solution for the application of ultracapacitors in source system design.

U.S. Pat. No. 7,946,209B2, United States, May 24, 2011, proposes to use a ultracapacitor to replace the battery system in the power supply system during the start-up cycle of the flying device. The invention refers to the application of a ultracapacitor power system for the start-up of a flying device, but there is no specific solution for the charging-discharging method, control and monitoring of the system.

Patent CN110809811A, China, 18 Feb. 2020, proposed control system to balance voltage on super capacitor, protecting the system from overvoltage phenomenon. Since the balanced control system is specifically designed for starting and stopping ultracapacitors, the complexity and size of the entire ultracapacitor power system can be greatly increased.

In this invention, the power system inherits the latest ultracapacitors manufacturing technologies, allowing the source system to operate at high temperatures, in environments with great shock and vibration. Furthermore, the ultracapacitor has a long maintenance-free life, operates many times, and is highly efficient due to very little heat generation, making it suitable for application on flying tools. Besides, the invention proposes a design and solution for charge-discharge control, ultracapacitor monitoring. The charge-discharge control and measurement of system operating states are integrated on one module thereby reducing complexity in the design and size of the system.

In this invention, the ultracapacitor power system is designed with a super condenser that stores energy, the charger and dischargers for the capacitor with the ability to stabilize the charging current and the output voltage of the system. The integrated monitoring module system allows continuous monitoring of the operating status of the capacitor.

TECHNICAL BACKGROUND OF THE INVENTION

Since proper backup is not possible unless an adequate number of Joules are stored on the backup capacitor, many applications require that charging is completed by the time the system boots up and is ready for operation. Hence, high charge currents are desirable, and since ultracapacitors typically have a max operating of 2.7V to 3.0V, it is necessary for several to be stacked in series. In such cases, provision must be made for balancing and protecting the capacitors as they charge to prevent damage and lifetime degradation due to overvoltage.

DETAILED DESCRIPTION OF THE INVENTION

Ultracapacitor-based power system is designed with charging input voltage in the range 22-29 VDC. The system output is within 28 VDC with 300 W for 30 seconds.

Figure 1:
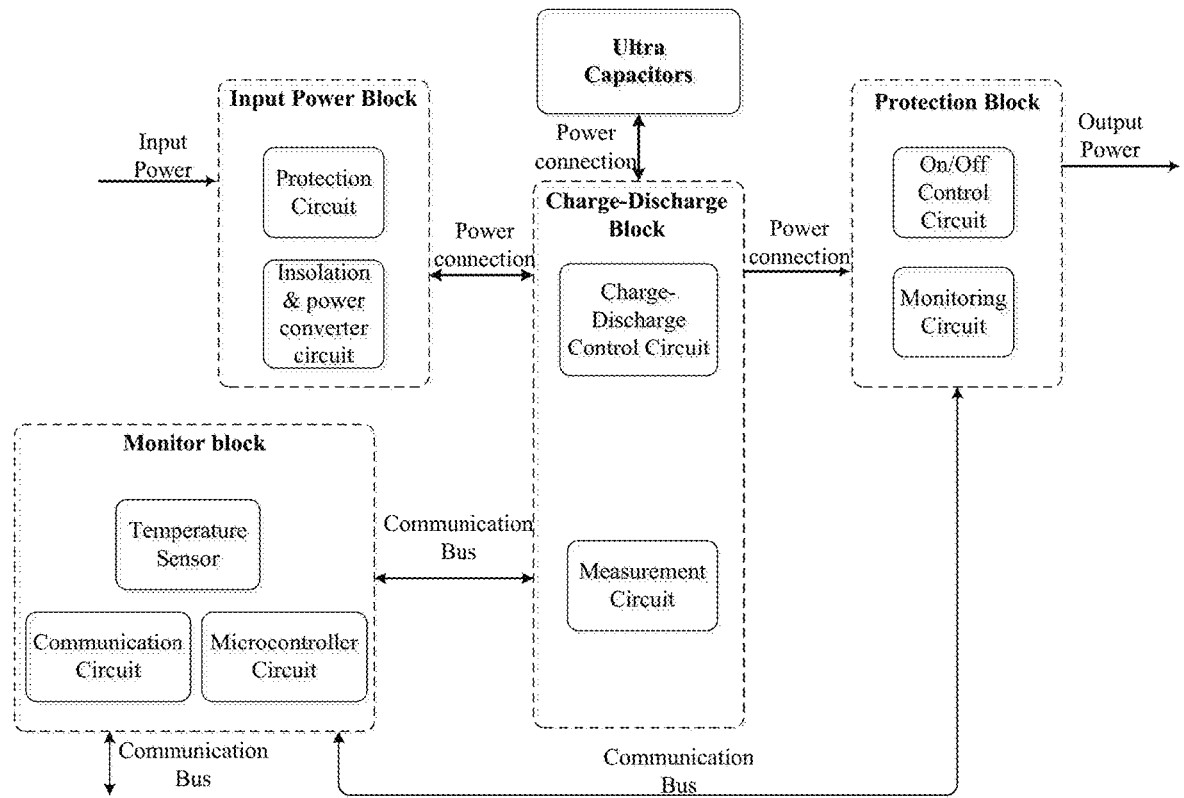
FIG. 1 shows a schematic diagram of a ultracapacitor source system function block.

As shown in FIG. 1, the ultracapacitor has the function of storing energy for the system. The selection of ultracapacitors is based on the formula's energy storage capacity.

$$W_{min} = \frac{P \times t}{n \times h}$$

In which, $W_{min}$ is the minimum stored energy of the ultracapacitor, P is the power supplied to the load, t is the power supply time to the load, n is the number of ultracapacitors used, h is the ratio of the performance of the capacitor.

As shown in FIG. 1, the power receiving assembly of the control circuit has the function of protecting the system on the input source side, supplying power to the whole system. Protective block functions to protect the system on the input source side and filter the input voltage. Protection unit ensures the system operates normally with maximum voltage 31.5 VDC with minimum voltage 18 VDC within 30 minutes, when subjected to instantaneous overvoltages with maximum amplitude of 250V, response time does not exceed 50 ms, the vibration frequency ranges from 100 kHz to 500 kHz and a maximum energy of 15 mJ, and when subjected to a 100 VDC pulse for 50 ms. The protection unit also protects the system from damage when the input is upside down. Isolator and converter is responsible for isolating and lowering the voltage, providing 3.3V stable power to the control circuit. The converter unit uses either the input source (during charging the capacitor) or the voltage from the condenser (when the input source is disconnected) as the power source for the control circuit.

As shown in FIG. 1, the monitoring and inspection block of the control circuit has the function of collecting information about the operating status of the system and transmitting information back to the monitoring computer. It's responsible for controlling the protective assembly and performing the ultracapacitor test as required from the outside. In it, the temperature sensor block measures the temperature on the circuit and on the case. Microcontroller unit has the function of reading system status information and sending messages to monitoring computer. In addition, the microcontroller unit is responsible for sending capacitance measurement and equivalent resistance of the condenser unit to the charging and discharging assembly and sending electrical switching control signals to the protection block. The communication and isolation unit converts the signal to the serial communication standard (RS-485), helping to communicate with external equipment.

As shown in FIG. 1, the charge-discharge assembly is responsible for charging and discharging the ultracapacitors. The block also has the function of measuring information on the operating state of the capacitor. Capacitor charge-discharge control unit has the function of lowering voltage and providing stable charging current. In addition, this unit also has the function of stabilizing the output voltage to the load, including a booster circuit that is controlled so that the output voltage remains constant until the voltage on the ultracapacitor falls below the allowable threshold. Control block charge-discharge capacitor also integrated voltage balance circuit for capacitors, overvoltage protection condenser. Measurement unit capable of monitoring system status, including information about voltage, current, temperature. In addition, the measuring unit also has the function to measure the capacitance value and equivalent resistance of the condenser when required to check from the monitoring and inspection block, these parameters are combined with electricity. The voltage on the capacitor will provide information about the total stored energy and maximum capacity the system can supply. The measurement unit communicates with the monitoring and test block through an Inter Integrated Circuit (I2C) communication.

As shown in FIG. 1, the protection block has the function of switching on and off the load and sending information about the current state of the ignition key to the monitoring and control block. Switching unit performs electrical switching according to the external request through control signals from the monitoring and inspection block. Supervision unit is responsible for monitoring the status of the switch, information about the state of the switch is passed through an isolation block before being transmitted to the monitoring block and checked.

Figure 2:
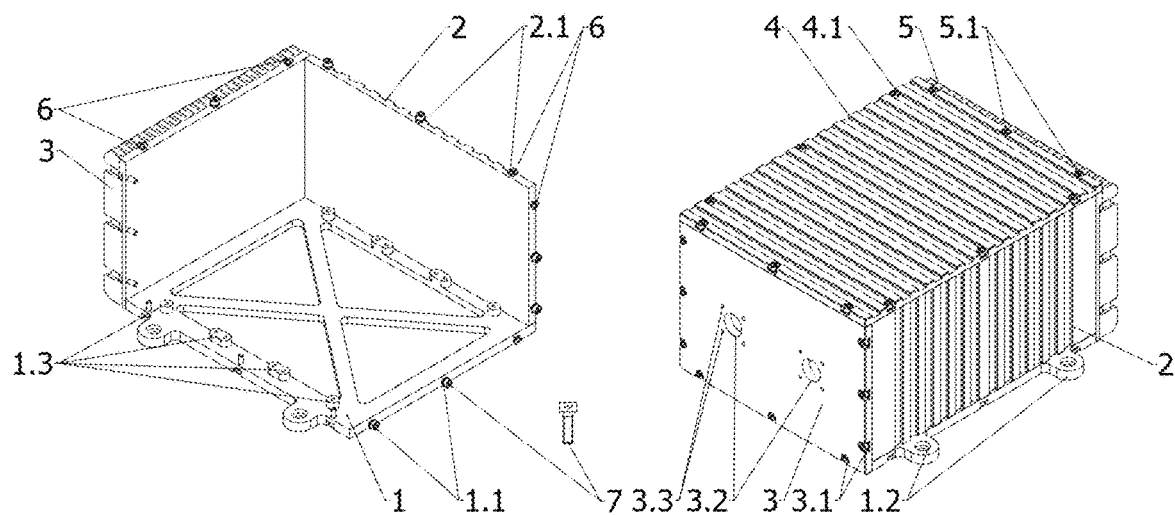
FIG. 2 shows the detailed layout of the mechanical box.
Figure 5:
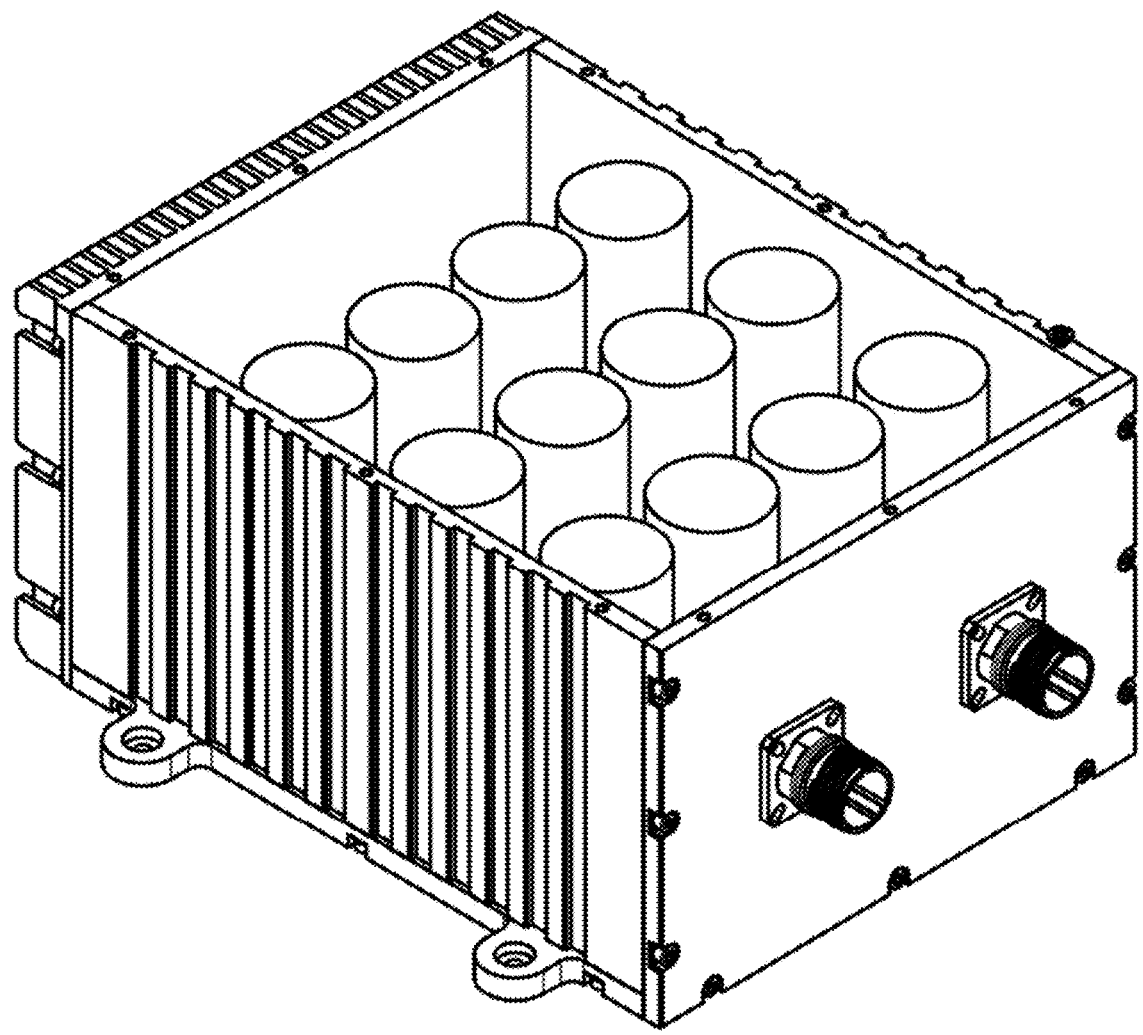
FIG. 5 shows the mechanical design of the ultracapacitor power system.

As shown in FIGS. 2 and 5, this is the ultracapacitor's mechanical box. Material used to design the mechanical box is aluminum, with the advantages of light-weight and good heat dissipation characteristic. The mechanical box protects the devices inside and dissipates heat from the outside of the box. The mechanical box is made up of plates: base plate 1, two side panels 2, connector plate 3, cover plate 4 and a radiator plate 5. On the plates (1, 2, 3, 4, 5) there are Corresponding openings (1.1, 2.1, 3.1, 4.1, 5.1) are 3 mm in diameter and are linked together by the black buckles 6 and screws 7, of size M3. The side panels 2, cover plate 4 and the radiator plate 5 are specially designed for heat dissipation. On the connector plate 3 there are round holes 3.2 and threaded holes 3.3 for placing and reinforcing the jacks to link outwards.

In which baseplate 1 is the basic surface used to connect the other sides (2, 3, 4, 5). On this base plate 1 there are 1.3 cylindrical stakes 8 mm high, with an internal thread size of 3 mm used to link the 8 condenser boards and the 10 internal control board together. In addition, the base plate 1 also has holes 1.2 used to fix the ultracapacitor to the necessary surfaces with certainty.

Figure 3:
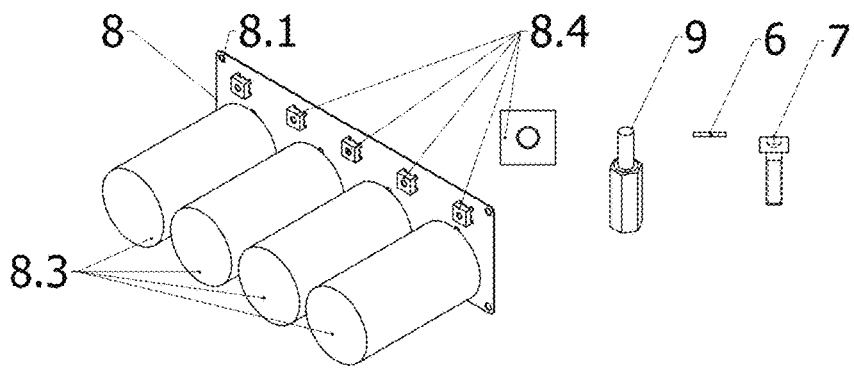
FIG. 3 shows a drawing of the condenser board.

As shown in FIG. 3, between the 8 and control board 10 are separated and a parallel mounting surface is created thanks to the 9 copper stakes. On the 8 board, there are four permanent solder points for storage capacitor 8.3. The capacitor power terminals 8.4 are used to connect the electrical signals from the 8 condenser board and the control board 10. To fix the 8 condenser board with 9 copper stakes in round holes 8.1 (diameter 3 mm) use the black bolts 6 and screws 7.

Figure 4:
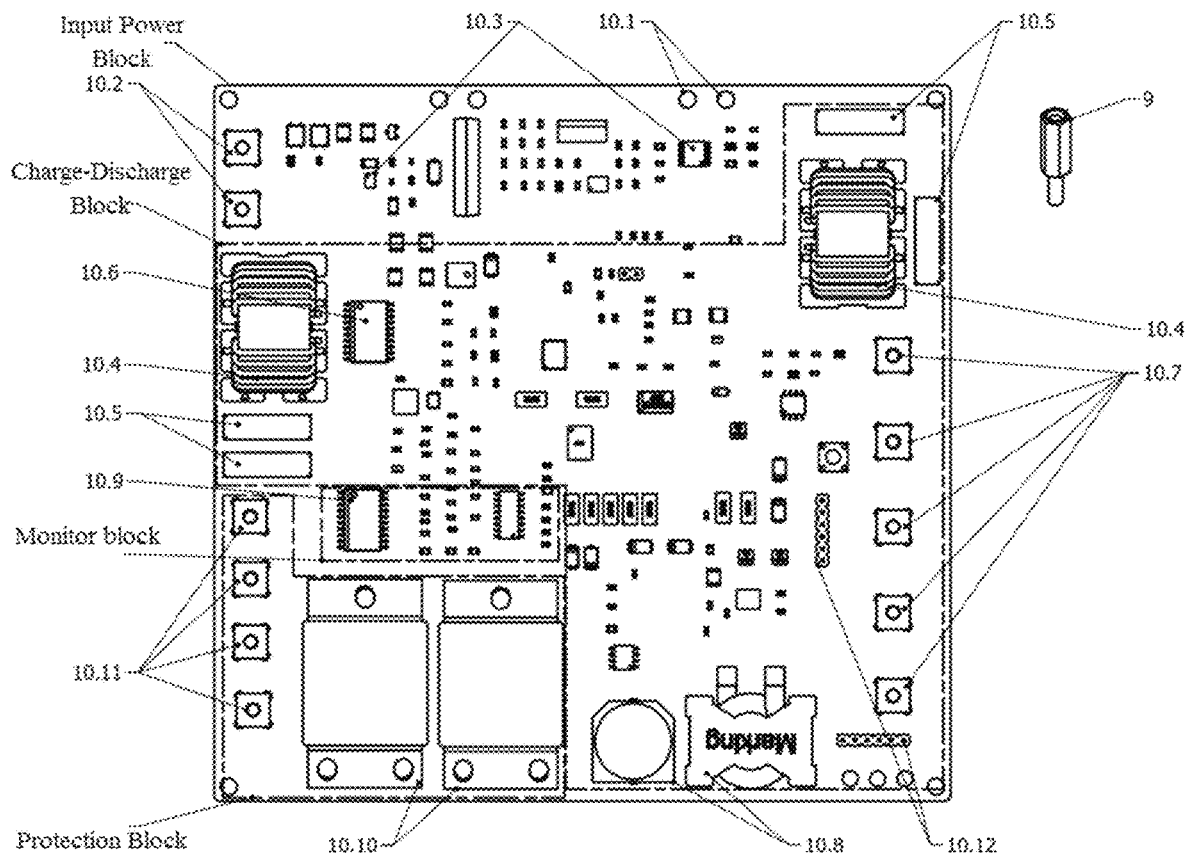
FIG. 4 shows a drawing of the controller board.

As shown in FIG. 4, here is the 10 controller board and the positions of the assemblies on the board. On the control board 10 there are divided main blocks: receiving block, charging and discharging block, monitoring and inspection block, protection block. The small holes 10.1 are used to fix the control board 10 to the base plate at the 1.3 posts by means of 9 copper piles. In the detail assemblies there are the following main components:

The power receiving block has input source 10.2 contacts used to receive the input source for the super capacitor. The source 10.3 chips perform the low-voltage and protective functions of the control circuit 10.

The charge-discharge assembly has coils 10.4 used to filter input and output sources. Isolating capacitors 10.5 are used to isolate the input source and the output source from the equipment case. The power control chip 10.6 has the function of controlling the charging and discharging of the 8.3 ultracapacitors through the 10.7 communication contacts. The output filter capacitors 10.8 perform the power filter function for ultracapacitors. 8.3.

Block monitoring and checking the chips monitor 10.9 used to monitor the parameters of voltage, current, resistance of the ultracapacitor 8.3 (Resistance mentioned here is resistive parasitic capacitors and could not be observed) and the temperature of the control board 10 during operation.

The protective block has relays 10.10 controlled by the 10.9 supervisor chip that performs the function of turning on/off the power to the 10.11 load power contacts.

In addition, the 10.12 signal jacks and the 10.11 load power contacts are used to communicate via the RS-485 standard and power out the device via the 3.2 circular holes on the connector plate 3.

IMPACT OF THE INVENTION

Ultracapacitor technology allows the battery power source system to operate in high temperature and vibration environments. The charging and discharging speed of the ultracapacitor power system is significantly faster than the one using battery/accumulator technology. Moreover, the system integrates charge/discharge controller and monitoring for the super capacitor power system to operate stably and reliably.

The invention claimed is:

1. An ultracapacitor power system having a function of storing energy includes four functional blocks, as follows:
a power receiving assembly includes a protective block that protects the system and filters an input source, a switch block has the function of low-voltage and isolating, supplying power to a control circuit;
a monitoring and inspection block includes the following functional blocks: a temperature sensor block is responsible for measuring a temperature on the circuit and on a box containing the system; a microcontroller unit reads data from a thermal sensor and measurement unit in a nap-discharge block, processes the data and sends messages to an outside of the system, and processes control commands from the outside and performs required system controls; a communication and isolation unit is responsible for converting signals into a serial communication standard (RS-485);
a charge-discharge assembly comprises of a charge-discharge control block that allows charging and discharging capacitors with stable current and voltage, keeping the system's output voltage constant during a discharge of the capacitor; the measurement unit allows monitoring of a physical operating state of the capacitor and allows equivalent capacitance and resistance measurements to be performed on request;
a protection block includes the following functional blocks: a switch lock block has the function of switching power output according to the control command; and a monitoring unit has the function of monitoring the status of an electric lock, sending information to the monitoring and inspection block.

* * * * *